United States Patent
Sargeant et al.

[11] Patent Number: 5,875,540
[45] Date of Patent: Mar. 2, 1999

[54] MODULAR DESIGN AND MANUFACTURE OF A STATOR CORE

[75] Inventors: John Barry Sargeant; Gurdev Singh; Calvin L. Paris, all of Oviedo, Fla.

[73] Assignee: Siemens Westinghouse Power Corporation, Orlando, Fla.

[21] Appl. No.: 775,338

[22] Filed: Jan. 21, 1997

[51] Int. Cl.⁶ .......................... H02K 15/02; H02K 15/12
[52] U.S. Cl. ............... 29/516; 310/216; 310/217
[58] Field of Search ............... 29/596, 609; 310/43, 310/216, 217, 218

[56] References Cited

U.S. PATENT DOCUMENTS

| | | | |
|---|---|---|---|
| 2,901,645 | 8/1959 | Sulger | 310/166 |
| 3,156,840 | 11/1964 | Clothier et al. | 310/259 |
| 3,261,707 | 7/1966 | Korski et al. | 29/596 |
| 3,465,188 | 9/1969 | Sisk | 29/596 |
| 3,505,729 | 4/1970 | Balke et al. | 29/596 |
| 3,513,527 | 5/1970 | Hoy | 29/596 |
| 3,525,889 | 8/1970 | Robinson et al. | 310/45 |
| 3,932,929 | 1/1976 | Hallerback et al. | 29/596 |
| 4,352,034 | 9/1982 | Karhan et al. | 310/59 |
| 4,392,072 | 7/1983 | Rosenberry . | |
| 4,542,313 | 9/1985 | Di Pietro | 310/65 |
| 5,203,070 | 4/1993 | Montgomery et al. | 29/596 |
| 5,274,291 | 12/1993 | Clarke | 310/112 |
| 5,365,137 | 11/1994 | Richardson et al. | 310/258 |
| 5,548,885 | 8/1996 | Yamada | 29/596 |

FOREIGN PATENT DOCUMENTS

WO 91/03855  3/1991  WIPO .
WO 94/06192  3/1994  WIPO .

*Primary Examiner*—Linda Johnson

[57] ABSTRACT

An improved stator core and process for manufacturing the core are accomplished by a modular stator core design. The stator core is comprised of a series of equally sized and shaped stator core modules that are manufactured via a vacuum pressure impregnation process. The prefabricated modules can then be assembled into a stator core in an efficient way, saving several days of stator core assembly time. Moreover, a variety of stator core lengths can be accommodated by only inserting the required number of modules into the stator frame.

9 Claims, 3 Drawing Sheets

MODULAR DESIGN AND MANUFACTURE OF A STATOR CORE

FIELD OF THE INVENTION

The invention relates the design and manufacture of electrical generation equipment. More particularly, the invention relates to the modular design and manufacture of stator cores for use in electrical generators.

BACKGROUND OF THE INVENTION

The generator stator core is the largest single component in the train of a turbine generator set. The stator cores are generally manufactured from thousands of laminations of relatively thin steel plates which are stacked, pressed and clamped together into a large cylindrical form, i.e., the shape of the stator core. The clamping is necessary to accommodate variations in thickness (commonly referred to as "crown") of the stock steel plates from which the laminations are punched. Improperly clamped laminations can result in plate vibration during generator operation, which results from magnetic impulses or core elliptical dilation. Moreover, air space between the laminations leads to high thermal resistance and decreased cooling efficiency. Fillers are often inserted into the stack of plates to compensate for voids caused by plate crown. Additionally, the fillers ensure that the clamping pressure is evenly distributed over the full plate area.

Typically, the stator core is assembled from the steel plates directly at the final installation site. However, the large size of the stator core and the need for proper clamping results in stator core manufacturing difficulties, including generous floor space and high crane requirements. Traditionally, two assembly procedures have been employed to form the cylindrical shaped stator core: In one procedure, the steel plates are stacked directly in a stator frame; in the other procedure, the steel plates are first stacked and clamped in an external stacking fixture. The complete stator core is then lifted into the stator frame via a large crane.

The manufacture of stator cores via the traditional methods results in manufacturing lead time and other associated manufacturing difficulties. For example, if the core is stacked directly in the stator frame, the frame must be delivered to the site before any manufacturing steps can occur. Additionally, intermediate core pressing equipment is needed to press and clamp the steel plates together at incremental lengths. If, on the other hand, the stator core is manufactured in an external fixture, the frame does not have to arrive on site before the manufacturing; however, the external fixture itself adds to the manufacturing costs and requires additional floor space on site. Moreover, the external fixture method requires a heavy duty crane of sufficient height to lift the assembled core into the stator frame. In either traditional manufacturing procedure, the core stacking process requires several days to complete.

In addition to assembly difficulties, stator cores assembled according to traditional methods experience operational problems. Such cores have a tendency to settle or relax during service. To help alleviate this tendency, various consolidation techniques and high clamping forces are required during assembly, further increasing the assembly time and costs. Moreover, heavy structural members are required at the core ends to hold the laminations in place, and access for future retightening may be required.

Thus, there is a need for an improved stator core design and manufacturing technique that increases the operational stability, while decreasing the time and cost of manufacturing a stator core.

SUMMARY OF THE INVENTION

The present invention meets the needs above by providing an improved stator core and a method for assembling the improved stator core. According to the method, stator core modules are prefabricated. The prefabricated modules are then inserted in the stator frame at any convenient assembly time. Each module is manufactured by clamping a stack of ferrous plates in a module fixture. The clamped stack of plates is placed in a vacuum chamber where a resin is applied to the stack of ferrous plates. The chamber is further pressurized to increase the impregnation of the resin between the plates. The prefabricated modules can then be stored or inserted into a stator frame to construct a stator core.

During assembly of a stator core, a selected number of modules are inserted into a stator frame. Thereafter, the stator core is clamped together. For example, through bolts are inserted through the axial length of the stator core, engaging each module and providing the force to hold the stator core together. Alternately, disk springs are inserted into the stator frame locking the modules together. The assembly is then complete, saving several days of on-site assembly while providing a stator core with improved operational characteristics.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF A PREFERRED EMBODIMENT

Figure 1:
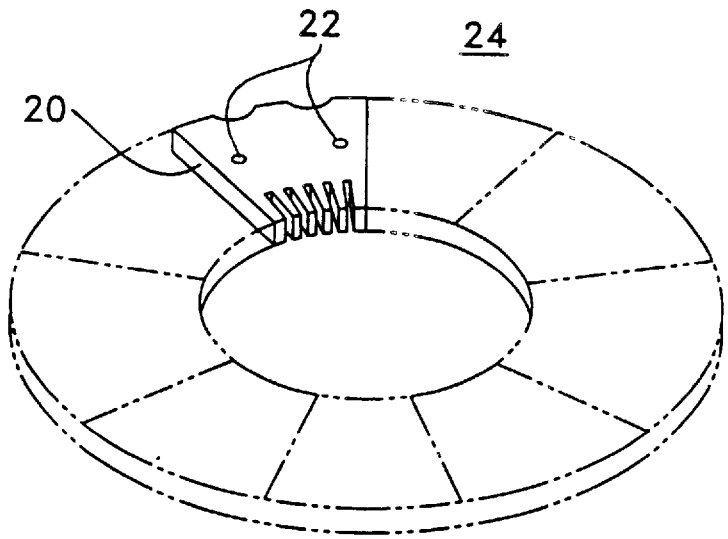
FIG. 1 is an isometric view of a layer of steel plates forming a single lamination layer for use in a stator core.

Referring now to the drawings wherein like numerals indicate like elements throughout, FIG. 1 depicts an exemplary stator core plate 20 for use in manufacturing a stator core in accordance with the present invention. Core plates 20, stamped from a piece of ferrous material, such as plate steel are arranged circumferentially to form rings, e.g., ring 24. As explained below, each ring 24 constitutes a single lamination layer in a multi-layered stator core module. In the stator core of the present example, nine of these plates are arranged to form a single ring 24; however, any suitable number of plates can be shaped and configured for use in a stator core of any desired diameter without departing from the scope of the present invention. As is described more fully below, a multi-layered laminated stator core module is formed by stacking multiple rings 24 such that each core plate 20 aligns with the underlying core plate 20 of the prior ring 24 layer.

Figure 2:
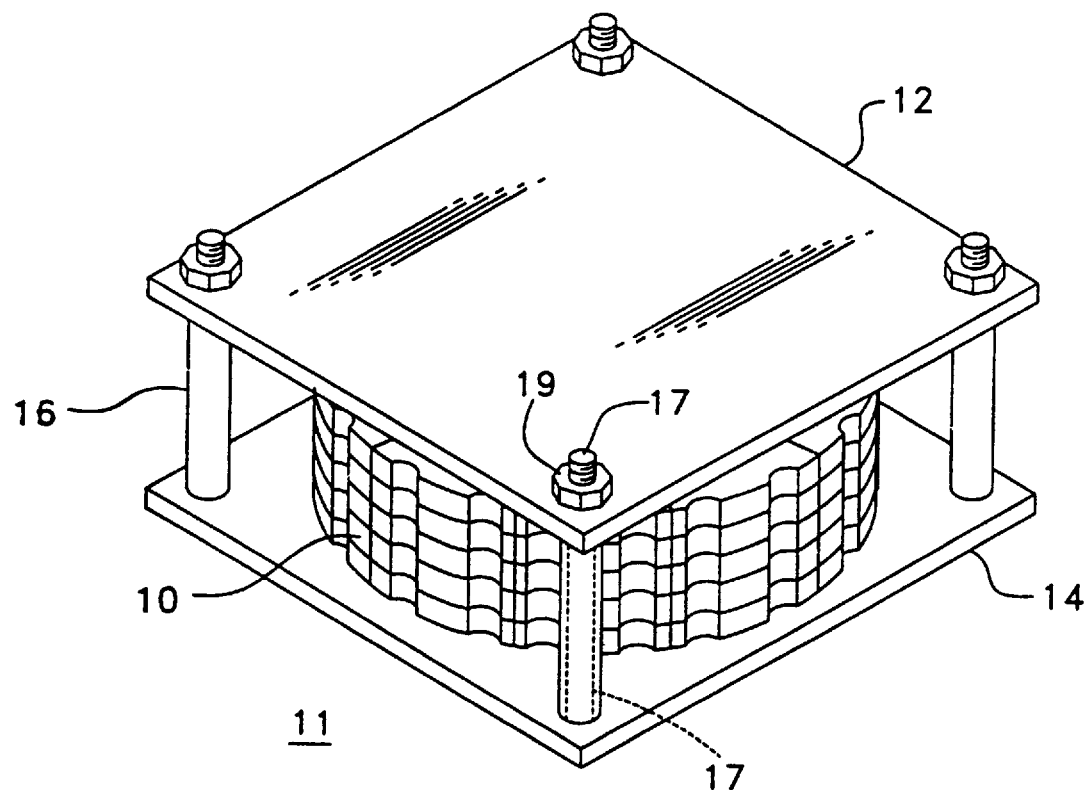
FIG. 2 is an isometric view of a stator core module in a module fixture in accordance with the present invention.

Referring to FIG. 2, a module fixture 11 is shown containing a stack of rings 24, sufficient to make a single core module. Rings 24 are stacked in module fixture 11 until the desired height is achieved, forming a core module 10 within module fixture 11. Module fixture 11 is comprised of a top compression plate 12 and a bottom compression plate 14, and precision sleeves 16 disposed at each corner of the the compression plates 12, 14. Each precision sleeve 16 is a hollow tube formed of substantially rigid material, such as steel. The length of each tube is cut to precisely the height of a completed core module 10. Bolts 17 are disposed through sleeves 16. Retaining nuts 19 are attached to bolts 17, holding bolts 17 within sleeves 16, and provide a mechanism for applying pressure to the set of plates comprising core module 10 disposed within module fixture 11. During operation of module fixture 11, a stack of rings (i.e., a module's worth of rings) is sandwiched between top compression plate 12 and bottom compression plate 14. As nuts 19 are tightened, compression plates 12, 14 squeeze the steel plate laminations 20 tightly together, until compression plates 12, 14 encounter sleeves 16. Module fixture 11 of the present invention can be adjusted to any desirable core module 10 height by adjusting the fixture for the appropriate number of ring layers. For example, changing the length of the sleeves 16 and adding additional plates would result in a higher core module 10.

Figure 3:
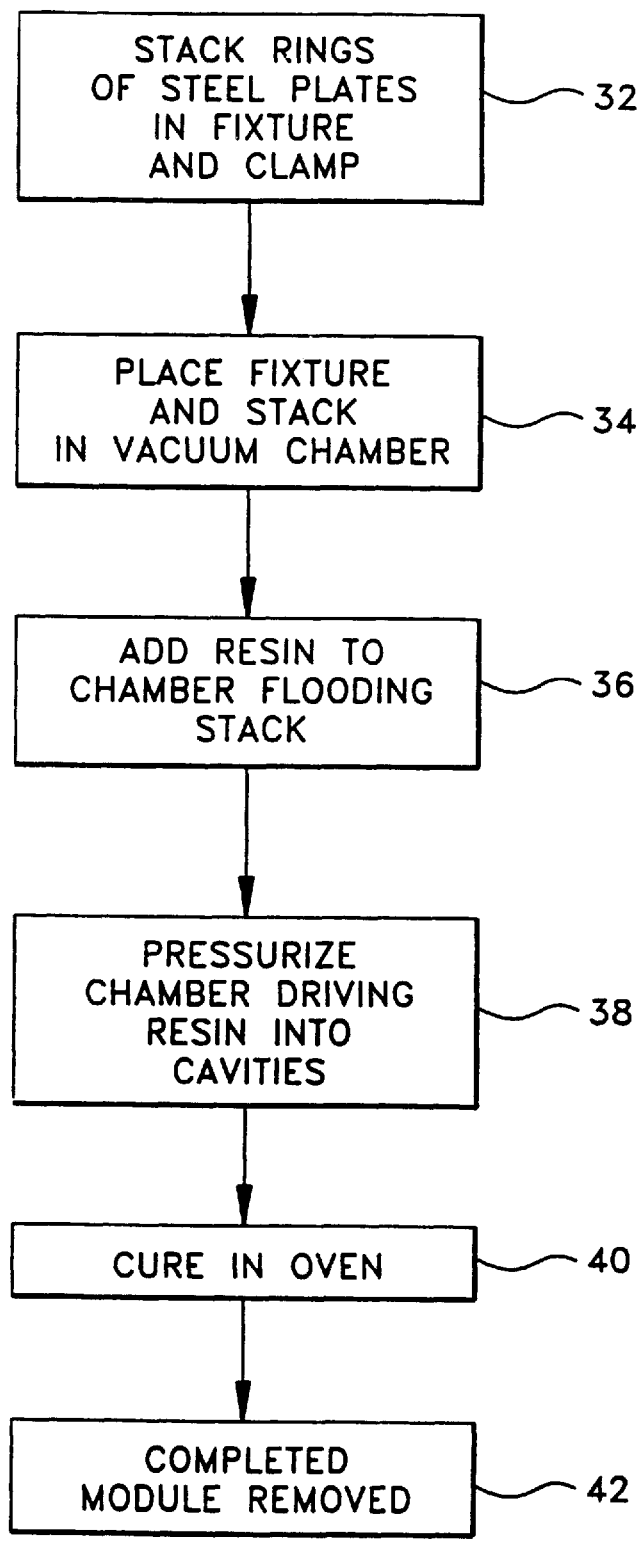
FIG. 3 is a flow chart of the process of manufacturing a stator core module in accordance with an aspect of the present invention; and, FIG. 4 is an exploded cut-away view of the insertion of stator core modules into a stator frame.

FIG. 3, presents a flow chart of the process of manufacturing a core module 10 in accordance with the present invention. At the initial step (32), steel plates 20 are arranged in rings 24 and stacked in module fixture 11, as described in detail with reference to FIG. 2. Bolts 19 are then tighten to until sleeves 16 are encountered by compression plates 12, 14. Core module 10 is then ready for Vacuum Pressure Impregnation bonding, according to well-known industry standards. To that end, in the next step (34), module fixture 11 containing compressed steel plates 20 is placed in a vacuum chamber (not shown). The chamber is then drawn down to about 1 to 2 mm Hg. After the vacuum is at the appropriate setting, the chamber is flooded with resin (step 36). As a result, the resin floods the stack of rings, entering any gaps between the ring layers. Next (step 38) the chamber is pressurized, further driving the resin into the cavities in the stack 10. The component is then removed from the chamber and placed in an oven (step 40). The oven is heated until the resin cures. A complete module core 10 is then removed from the fixture and is ready for use in constructing a stator core or stored for later use (step 42). The resulting module core 10 provides improved heat conduction, as well as improved operational stability.

Figure 4:
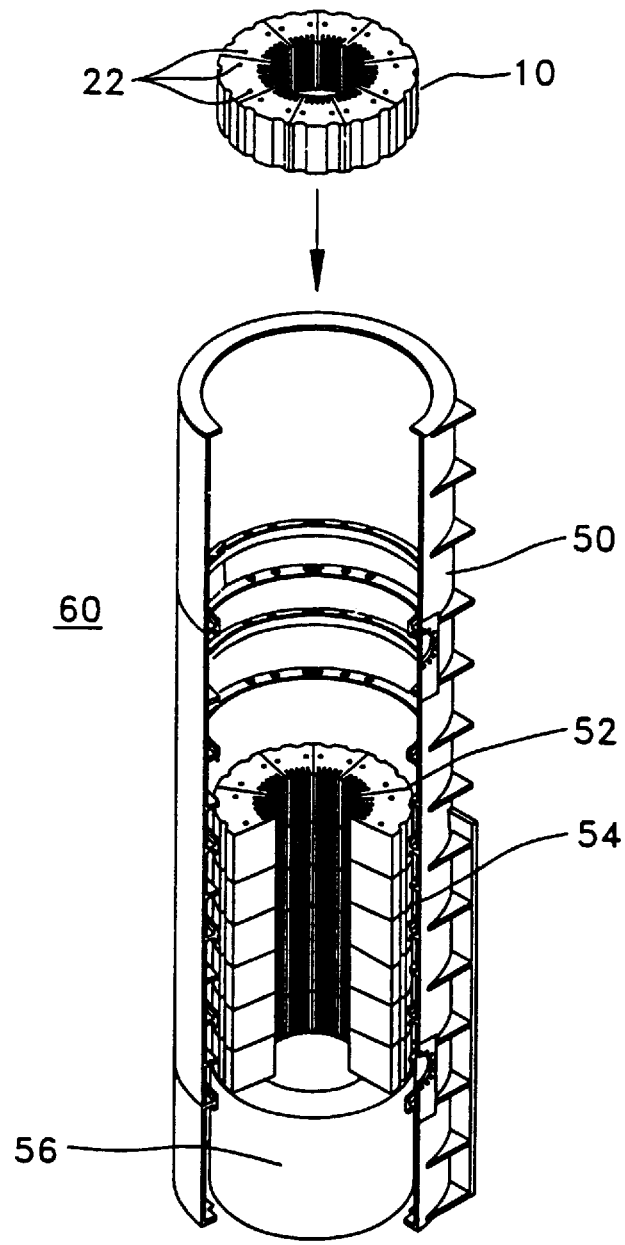

Referring now to FIG. 4, the manufacture of a stator core from a plurality of core modules 10 is depicted. As with a conventional stator, stator 60 is comprised of a stator frame 50 and a stator core 52. However, unlike a conventional stator, stator 60 is manufactured with core modules 10, manufactured in accordance with the procedure described with reference to FIG. 3. By contrast to some of the traditional methods of manufacturing a stator, stator core 60 can be assembled directly in the frame 50, obviating the use of a separate external fixture at the assembly site and alleviating the need for high pressure stack compression. Other advantages are obtained by the modular stator core design. For example, core modules 10 are pre-assembled and shipped to the final assembly site at the time of stator assembly. As a result, the modules can be pre-manufactured off site under better controlled conditions. Moreover, much lighter duty equipment can be used to lift the core modules 10 into the frame than would otherwise be needed to lift an entire stator core into the frame. The result of these advantages is a stator core with improved operational characteristics, including heat transfer and relaxation. Moreover, the final assembly time can be shortened from several days to as few as a single day.

The stator core assembly is best described with reference to FIG. 4. Initially, a stator frame 50 is placed in an upright position to accept core modules 10. A temporary assembly base 56 is placed in the bottom of the upright stator frame during assembly. Base 56 is provided during assembly to support core modules 10 in the proper position within stator frame 50. After assembly is complete, base 56 is removed. After stator frame 50 is prepared for assembly, a selected number of core modules 10 are lifted into the stator frame 50. The number of cores modules selected will vary depending on the desired stator length and the selected core module 10 size. When all of the selected core modules 10 are properly positioned in stator frame 50, through bolts (not shown) are inserted axially through the stator core assembly via holes 22. The through bolts are then tightened to complete the stator core assembly. Spring bars 54 are then tightened to attach the stator core 52 to the stator frame 50. Stator 60 is then ready for attachment to the turbine (not shown).

Those skilled in the art will recognize that other methods are available to bind the completed stator core together. For example, disk springs and keys could be inserted into both ends of the frame locking the modules together.

Significantly, the processes described above for manufacturing stator core modules and stators provide significant manufacturing benefits. For example, core modules 10 can be prefabricated to a standard size in a production environment, providing all of the quality control benefits inherent in such an environment. Those core modules can then be stored or shipped as needed to the location of stator assembly. Moreover, stators of varying lengths can use the same core module building blocks. By merely selecting the number of core modules required for a given stator length and assembling those core modules into the frame, the stator manufacturing process can be standardized. Accordingly, the final stator assembly process involves the assembly of a small number of core modules; whereas current practice requires the assembly of thousands of steel plates.

The present invention may be embodied in other specific forms without departing from the spirit or essential attributes thereof, for example, the steel plates could be coted with resin and pressed together to bond the core modules rather than using Vacuum Pressure Impregnation. Accordingly, reference should be made to the appended claims, rather than to the foregoing specification, as indicating the scope of the invention.

It is claimed:

1. A method for assembling a stator core, comprising the steps of:

a) manufacturing at least two stator core modules, wherein each module is manufactured by clamping a stack of ferrous plates in a first fixture, placing the clamped stack of plates in a vacuum chamber, applying resin to said stack of ferrous plates, and pressurizing said chamber; and, b) inserting said at least two stator core modules into a stator frame.

c) clamping said stator core modules together.

2. Method according to claim 1 wherein said resin is cured by baking.

3. Method according to claim 1 wherein the step a) further comprises pressurizing the vacuum chamber such that the resin is further forced between the ferrous plates.

4. Method according to claim 1 wherein said ferrous plates comprise plate steel.

5. Method according to claim 1 wherein said clamping of step c) comprises the use of through bolts.

6. Method according to claim 1 wherein said clamping of step c) comprises the use of disk plates.

7. A method for manufacturing a stator core module, comprising the steps of:

a) clamping a stack of ferrous plates in a fixture;

b) placing the fixture containing the plates in a vacuum chamber;

c) while the plates remain in the vacuum chamber, applying resin to said plates; and, d) pressurizing said vacuum chamber, whereby the resin is further forced between the plates.

8. Method according to claim 7 wherein said resin is cured by baking said stack of plates after said resin is applied.

9. Method according to claim 7 wherein said vacuum is in the range of 1 to 2 mm Hg.

* * * * *